United States Patent [19]

Corsi

[11] Patent Number: 5,385,436

[45] Date of Patent: Jan. 31, 1995

[54] INDEXED OPERATING HEAD FOR AUTOMATIC MACHINE TOOLS

[75] Inventor: Armando Corsi, Piacenza, Italy

[73] Assignee: Jobs S.p.A., Piacenza, Italy

[21] Appl. No.: 178,939

[22] Filed: Jan. 7, 1994

[30] Foreign Application Priority Data

Jan. 15, 1993 [IT] Italy .................... PC93A000002

[51] Int. Cl.⁶ ................................ B23C 1/12
[52] U.S. Cl. .................... 409/201; 409/216; 409/230
[58] Field of Search ........... 409/144, 201, 215, 216, 409/211, 230, 231

[56] References Cited

U.S. PATENT DOCUMENTS

| | | | |
|---|---|---|---|
| 3,460,435 | 8/1969 | Hucks et al. | 409/230 |
| 3,483,796 | 12/1969 | Galbarini et al. | 409/216 |
| 4,652,190 | 3/1987 | Corsi | 409/201 |
| 5,286,146 | 2/1994 | Corsi | 409/201 |

FOREIGN PATENT DOCUMENTS

| | | | |
|---|---|---|---|
| 254542 | 3/1988 | German Dem. Rep. | 409/201 |
| 3206121 | 9/1983 | Germany | 409/201 |
| 171239 | 10/1983 | Japan | 409/216 |
| 222809 | 9/1989 | Japan | 409/211 |
| 178709 | 8/1991 | Japan | 409/201 |

*Primary Examiner*—Daniel W. Howell
*Attorney, Agent, or Firm*—Oblon, Spivak, McClelland, Maier & Neustadt

[57] ABSTRACT

An operating head for automatic machine tools, which includes a fork fitted on a support having various degrees of freedom; a mechanism for the numerical control of rotation of the fork around its axis; a support for a chuck, being fitted up on said fork and rotatably relative to it around an axis which is orthogonal to the former, under a numerical control; a shaft coaxial with the axis of rotation of the support for the chuck and connected, by the use of bevel gears, at one end to devices for the transmission of motion and, at its other end, to the shaft of the chuck wherein devices are provided for allowing change of the angular position of both the fork and support for the chuck, keeping the tool in contact with the piece to be machined.

12 Claims, 2 Drawing Sheets

INDEXED OPERATING HEAD FOR AUTOMATIC MACHINE TOOLS

BACKGROUND OF THE INVENTION

1. Field of the Invention

The present invention relates to an operating head for automatic machine tools, of the kind comprising:

a fork fitted up on a support having several degrees of freedom;

means for the numerical control of the rotations of the fork around its axis;

a support for a chuck, being fitted up on said fork and rotatable around it under a numerical control as well, in which devices are provided for allowing the head to be reconfigurated by changing the angular position of both the fork and the support for the chuck, while keeping the tool in contact with the piece to be machined.

This allows to achieve various advantages, especially when machining the outer part of the piece in by removing material for example in making contours or the like, since it is possible to reconfigurate the head without taking off the tool from the piece, preventing the signs of restarting machining from being visible.

2. Discussion of the Background

Various kinds of machine tools are known having an operating head, on which a chuck is fitted up with a connection for the tool, and the shifts of which are numerically controlled to perform even complex machining.

In particular, machines are known comprising a support arm which is movable along a set of three Cartesian axes whereto a fork is hinged which, being numerically controlled, can rotate around the axis of the arm (axis C) and to which the support for a chuck is hinged, which, being numerically controlled as well, can in turn rotate around an axis which is orthogonal to the former (axis A).

An operating head of this kind is described, e.g., in the U.S. Pat. No. 4 904 131.

In some cases these heads are indexed, i.e. they are provided with means permitting both the fork and the support of the chuck to be locked in a discrete number of angular positions around their axes, in order to enable the head to be configured according to the shape of the piece to be machined.

For this purpose the connection between the support for the chuck and the fork or between the fork and its support takes place by means of pairs of mutually engaging racks, thus locking the various components in the desired configuration.

The present invention relates in particular, although not exclusively, to such an operating head.

In the known operating heads, in order to disengage either pair of racks and achieve a new configuration by rotating either the fork or the support of the chuck or both, we always intervene by moving the rack connected with the movable component, i.e. when adjusting the angular position of the chuck, the rack connected thereto is moved, leaving at the same time fixed the rack connected to the fork, whereas, in order to rotate the fork, the rack connected thereto is moved, leaving fixed the rack connected to the supporting arm.

Up to now this solution has been universally adopted, since the shift of the rack fitted up on the fixed portion of the head turned out to be extremely complicated.

However, this solution presents the disadvantage of the need to lift the tool from the piece in order to reconfigurate the head, with the drawback that, when the tool is lowered again to resume machining, on the piece the sign of restarting remains.

SUMMARY OF THE INVENTION

The object of the present invention is to overcome the above-mentioned drawback and, for this purpose, an operating head of the above-described kind is provided, in which, however, the racks forming each pair of racks disengage by moving the rack connected to the fixed portion of the head.

With this system it is possible to reconfigure the machine without removing the tool from the piece, thus avoiding any sign of restarting machining.

BRIEF DESCRIPTION OF THE DRAWINGS

The present invention will be now described in detail, by way of example, with reference to the enclosed drawings, in which.

DESCRIPTION OF THE PREFERRED EMBODIMENTS

Figure 1:
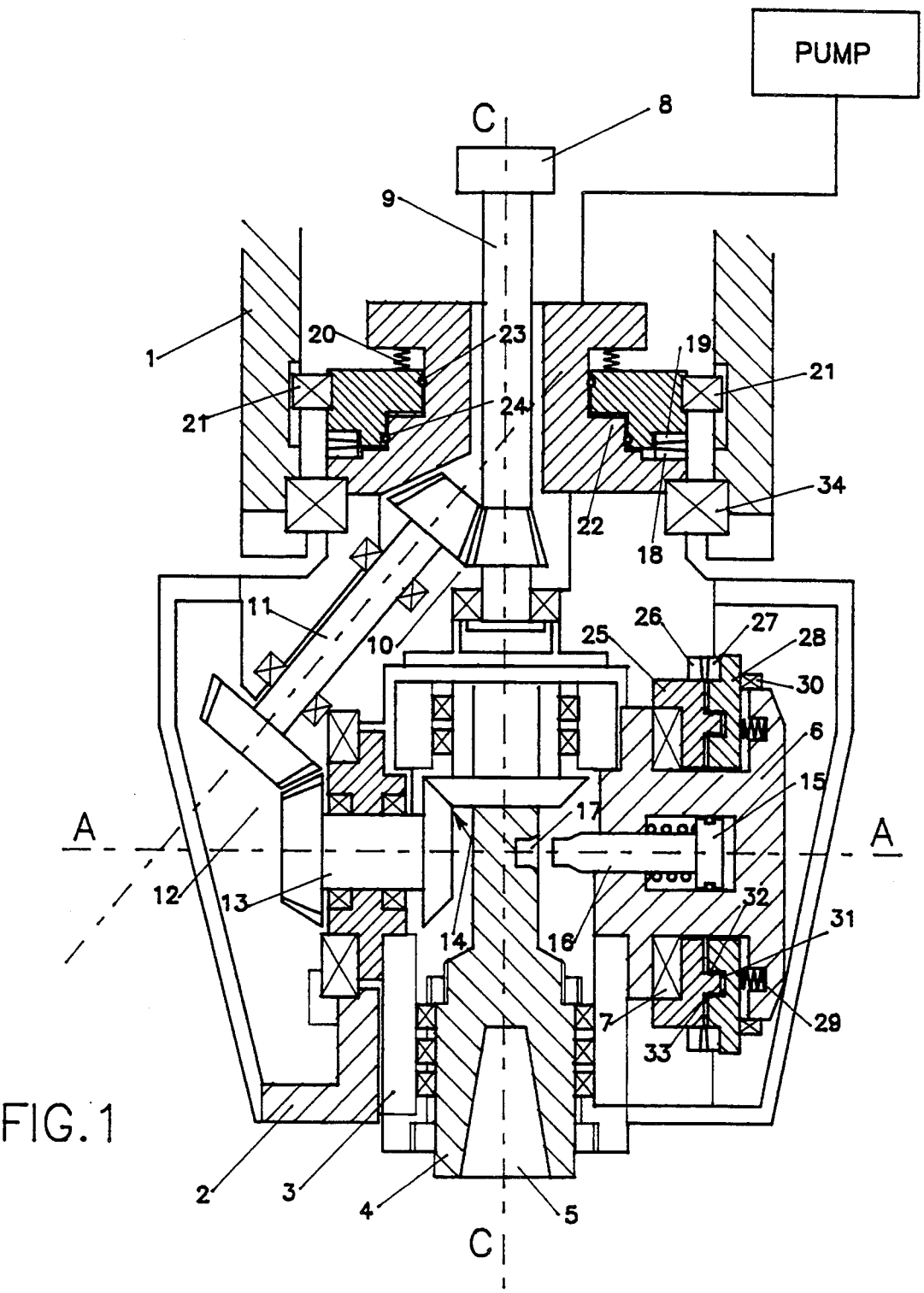
FIG. 1 shows a sectional view of an operating head according to the invention.

In the figure the reference numeral 1 designates the supporting arm or metal tube, on which a fork 2 is fitted up, to the arms of which the support 3 for a chuck 4 is hinged, said chuck 4 being provided with a conical connection 5 for the tool.

The fork 2 is fitted up on the metal tube 1 by means of a thrust-bearing 34, whereby the fork can rotate around the axis of the metal tube (axis C).

The support for the chuck is fastened to a hub 6 and is fitted up on the arms of the fork by means of bearings 7 which allow them to be rotated around an axis which is orthogonal to the former (axis A).

A motor 8, placed in the metal tube 1, makes a shaft 9 rotate directly, said shaft 9 transmitting motion, by means of bevel gears 10, to an inclined shaft 11, which, in turn, by means of bevel gears designated by the reference numeral 12, makes a shaft 13 rotate, said shaft 13 being coaxial with the hub of the support for the chuck.

At its opposite end the shaft 13 is connected with the chuck by means of a final drive 14.

Inside the hub 6 a cylinder is provided in which a piston 15 slides, the movements of which cause the end of a stem 16 to engage a corresponding seat 17 in the body of the chuck, in order to block its rotation around axis C. The piston 15 and its stem 16 are coaxial with axis A, to allow anyway the support 3 for the chuck to rotate around axis A, even when the stem 16 engages the seat 17.

A circular rack 18 is integral with the body of the fork, said circular rack 18 engaging with a corresponding rack 19 slidingly fitted up on the shaft of the fork, to perform limited axial shifts being parallel to axis C in contrast with the force exerted by springs 20 or the like, which tend to keep mutually engaged the teeth of the racks 18 and 19.

One or more keys 21 engage the rack 19 and the body of the metal tube, thus enabling the rack 19 to slide, but not to rotate relative to the body of the metal tube itself.

In its interior the rack 19 is stepped and it is connected with a corresponding step, designated by the reference numeral 22, obtained in the shaft of the fork.

Near the vertical walls of the rack 19, which look onto the corresponding walls of the fork, there are seals 23 and 24.

This way between the horizontal walls of the rack 19 and of the body of the fork, near the step 22, a sort of annular chamber is formed which is connected, by means of ducts not shown in the figure, to devices capable of pumping a fluid under-pressure into the chamber via the pump shown in FIG. 1, in order to actuate the shift of the rack 19 in contrast with the force exerted by the springs 20 and to disengage it from the rack 18.

Figure 2B:
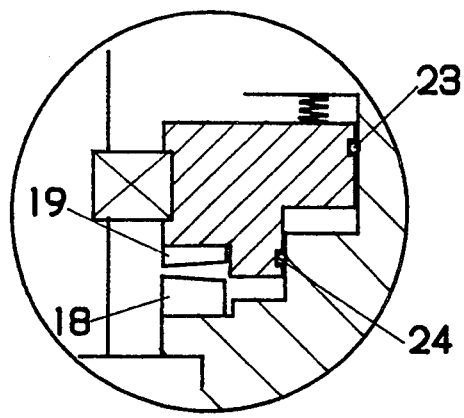
FIGS. 2a and 2b show a detail of the operating head according to the invention, in the engaged and in the disengaged position of the racks, respectively.
Figure 2A:
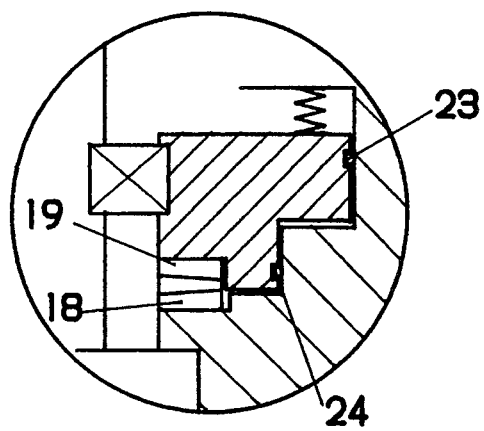

In FIGS. 2a and 2b the detail now described is shown, in the positions of engagement and disengagement of the racks.

Similarly, a circular rack 25 is fastened to the hub 6 supporting the chuck, the teeth 26 of said rack 25 engaging corresponding teeth 27 of a circular rack 28, which is also fitted up on the hub 6 but can slide axially in contrast with the force exerted by springs 29. A key 30 prevents angular shifts between the rack 28 and the arm of the fork, allowing, however, their mutual sliding.

The conjugate surfaces of the racks 25 and 28 are also shaped to define a chamber 31, which is delimited by seals 32 and 33 and is connected to means making it possible to pump under-pressure fluid.

Figure 3:
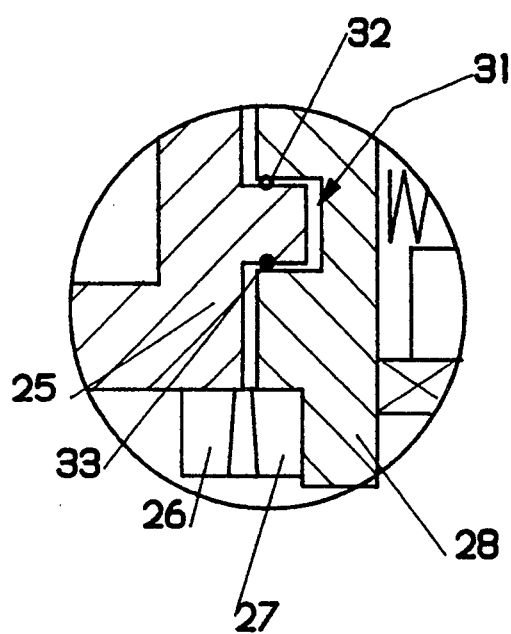
FIG. 3 shows another detail of the head.

This detail is shown enlarged in FIG. 3.

Operation of the invention takes place as follows.

The pairs of racks 18-19 and 25-28 being mutually engaged, the motion imposed by the motor 8 on the shaft 9 is transmitted, by means of the final drives 10 and 12, to the shafts 11 and 13 respectively.

From here, by means of the final drive 14, the motion is transmitted to the chuck, setting it into rotation around its axis, in order to machine the piece.

When it is necessary to change the configuration of the machine, once the motor 8 has been stopped, the piston 15 is driven, said piston 15 leading the pin 16 to become positioned in the seat 17 of the chuck, preventing it from rotating around its axis.

At this point, in order to rotate the fork around axis C, fluid under-pressure fluid is pumped into the chamber located between the shaft of the fork and the rack 19, causing its axial shift and leading it, by overcoming the force of the springs 20, into the opening position shown in FIG. 2b.

Thus, the teeth of the racks 18 and 19 being disengaged, on imposing a rotation to the shaft 9 by means of the motor 8, since the whole kinematic chain has been locked from the beginning as a consequence of locking the chuck, the whole fork rotates around axis C.

The amplitude of the rotation is controlled by means of the motor 8, whereas the positioning precision results from the engagement between the teeth of the circular racks 18 and 19.

In the same way, in order to change the angular position of the support for the chuck around axis A the pin 16 is led to engage the seat 17, and fluid is pumped into the chamber 31, this time thus realizing the axial shifting of the circular rack 25.

By proceeding as mentioned before, by means of the rotation of the shaft 9 this time the positioning of the support for the chuck relative to axis A may be controlled.

Therefore, with the described solution it is possible to change at will the configuration of the head, by adjusting its angular positions relative both to axis A and to axis C, without any need to lift the tool, which can always keep in contact with the piece to be machined and avoid, in such a way, that thereon remains the sign of restarting when machining is resumed. An expert of the field will then be able to provide for several modifications and variations, which, however, shall all be considered included in the range of the present invention.

I claim:

1. An operating head for automatic machine tools, which comprises:

a fork fitted on a support having at least two degrees of freedom;

means for numerically controlling rotation of the fork around a first axis;

a support for a chuck fitted on said fork and rotatable relative thereto, under a numerical control, around a second axis which is orthogonal to the first axis, wherein said chuck includes a connection for a tool; and means for allowing changing of the angular position of both the fork and the support for the chuck and for keeping the tool in contact with the piece to be machined wherein a single kinematic chain is provided, said kinematic chain comprising a first shaft driven by a motor and co-axial to the first axis of the fork, a second, inclined shaft connected through first bevel gears to said first shaft and through second bevel gears to a third shaft which is co-axial to the support for the chuck, wherein first means and second means are provided for locking said fork and for locking said support respectively, and wherein means are provided, for blocking the rotation of said chuck and means for releasing said first and/or said second locking means, for keeping said chuck blocked.

2. An operating head for automatic machine tools, according to claim 1, wherein said first locking means for locking said fork comprise a first circular rack which is integral with the body of said fork and coaxial to the axis thereof and a second circular rack, which is coaxial with said first rack, which is slidable axially on the shaft of said fork and movable between a first position of engagement with said first rack and a second position in which said first and second racks are disengaged.

3. An operating head for automatic machine tools, according to claim 1, wherein said second locking means for locking said support of the chuck comprise a first circular rack which is integral with the support for the chuck and coaxial therewith and a second circular rack which is coaxial with the first rack, which is axially slidable on said support for the chuck and movable between a first position of engagement with said first rack and a second position in which said first and second racks are disengaged.

4. An operating head for automatic machine tools, according to claim 2, wherein said first and second racks have opposite surfaces defining a chamber with a variable volume, and which comprise means for pumping a fluid under-pressure into said chamber.

5. An operating head for automatic machine tools, according to claim 3, wherein said first and second racks have opposite surfaces defining a chamber with variable volume, which comprises means for pumping a fluid under-pressure into said chamber.

6. An operating head for automatic machine tools, according with claim 1, wherein said means for blocking the rotation of the chuck includes a pin which is coaxial to the axis of rotation of said support for the chuck around the arms of the fork.

7. An operating head for automatic machine tools, which comprises:
- a fork fitted on a support having at least two degrees of freedom;
- a mechanism for numerically controlling rotation of the fork around a first axis;
- a support for a chuck fitted on said fork and rotatable relative thereto, under a numerical control, around a second axis which is orthogonal to the first axis, wherein said chuck includes a connection for a tool;
- a mechanism for allowing changing of the angular position of both the fork and the support for the chuck and for keeping the tool in contact with the piece to be machined wherein a single kinematic chain is provided, said kinematic chain comprising a first shaft driven by a motor and co-axial to the first axis of the fork, a second inclined shaft, connected through first bevel gears to said first shaft and through second bevel gears to a third shaft which is co-axial to the support for the chuck, wherein a first mechanism and a second mechanism are provided, for locking said fork and for locking said support respectively, and
- wherein a mechanism is provided, for blocking the rotation of said chuck and a mechanism for releasing said first and/or said second locking mechanism, for keeping said chuck blocked.

8. An operating head for automatic machine tools, according to claim 7, wherein said first locking mechanism for locking said fork comprises a first circular rack which is integral with the body of said fork and coaxial to the axis thereof and a second circular rack, which is coaxial with said first rack, which is slidable axially on the shaft of said fork and movable between a first position of engagement with said first rack and a second position in which said first and second racks are disengaged.

9. An operating head for automatic machine tools, according to claim 7, wherein said second locking mechanism for locking said support of the chuck comprises a first circular rack which is integral with the support for the chuck and coaxial therewith and a second circular rack which is coaxial with the first rack, which is axially slidable on said support for the chuck and movable between a first position of engagement with said first rack and a second position in which said first and second racks are disengaged.

10. An operating head for automatic machine tools, according to claim 8, wherein said first and second racks have opposite surfaces defining a chamber with a variable volume, and which comprise a mechanism for pumping a fluid under-pressure into said chamber.

11. An operating head for automatic machine tools, according to claim 9, wherein said first and second racks have opposite surfaces defining a chamber with a variable volume, which comprises a mechanism for pumping a fluid under-pressure into said chamber.

12. An operating head for automatic machine tools, according with claim 7, wherein said mechanism for blocking the rotation of the chuck includes a pin which is coaxial to the axis of rotation of said support for the chuck around the arms of the fork.

* * * * *